United States Patent [19]

Cardero

[11] Patent Number: 4,506,305
[45] Date of Patent: Mar. 19, 1985

[54] METHOD FOR DETECTING A FAULT IN A DATA RECORDING SYSTEM READ CHANNEL

[75] Inventor: Silvio A. Cardero, Tucson, Ariz.

[73] Assignee: International Business Machines Corporation, Armonk, N.Y.

[21] Appl. No.: 433,186

[22] Filed: Oct. 6, 1982

[51] Int. Cl.³ .................. G11B 5/09; G11B 27/36; G11B 5/02
[52] U.S. Cl. ........................... 360/46; 360/31; 360/68
[58] Field of Search .............. 360/25, 31, 65, 67, 360/68, 46; 324/212; 371/20, 22, 23

[56] References Cited

U.S. PATENT DOCUMENTS 4,003,084  1/1977  Fletcher et al. ............... 360/31
4,262,313  4/1981  Mouri ........................... 360/31

Primary Examiner—Vincent P. Canney
Attorney, Agent, or Firm—Pollock, Vande Sande & Priddy

[57] ABSTRACT

A method for diagnosing card failure in a data processing magnetic tape READ channel. An input signal of a nominal amplitude is applied to the READ channel and the response time of the various components of the READ channel is determined, as well as the amplitude response of the READ channel. Card failure can be so identified to alert a user that repair action is needed, cut down diagnostic cost and error, by the field engineer to avoid data processing errors produced by a defective machine.

7 Claims, 2 Drawing Figures

METHOD FOR DETECTING A FAULT IN A DATA RECORDING SYSTEM READ CHANNEL

The present invention relates to isolating card malfunctions in a digital data recording system having a plurality of recording tracks. Specifically, a method for implementing internal diagnostic procedures to existing READ channel hardware is provided which will identify faults at the card level.

Digital recording systems which store on magnetic tape a plurality of tracks of digital data as recorded analog signal levels are well known. The systems are employed in large scale data processing systems and include a READ channel which converts the analog signal level to a digital signal for use in a digital computer. A host microprocessor controller controls the READ/WRITE functions sequencing for all tracks. The READ channel has a gain controlled by a controller initialization sequence every time a tape is loaded to establish a normalized READ analog signal level. The normalized READ signal level is then applied to a limiter for conversion into a digital signal. The International Business Machines Corporation has manufactured such systems as the Pima recording system.

A component failure in the READ channel will adversely affect the reproduction of the analog signal stored on tape causing errors in the played back digital data. Many of the advanced digital recording systems have error recovery algorithms which allow the system to continue operation even under a partial failure, thus masking the presence of a fault in a circuit module of the READ channel. When marginal tapes are utilized in a system operating under the error correcting algorithms, errors may result which are not correctable. Many cards are involved in the retrieval of data from tape. A failure as described above can occur on any of these cards. Hence, it is necessary to provide for each card a method for self diagnosis to alert, speed up, and reduce error and cost of repair actions.

SUMMARY OF THE INVENTION

It is a primary object of this invention to provide for a method of testing a READ channel in a data recording system for card failure.

It is a more specific object to this invention to provide a method for identifying card failure in a data recording system by a procedure of self diagnostic testing performed by existing system hardware so as to avoid diagnosing the diagnostic hardware.

These and other objects are provided by a testing method in accordance with the invention. In a microprocessor controlled system wherein a plurality of READ channels are employed in a multi-track recording system, a sequence of steps are carried out which determine the presence of a component fault in the READ channel.

The READ channel includes a gain controlled amplifier, amplitude sense circuit and programmable threshold generator which in cooperation with a microprocessor controller, establish a normalized gain for the READ channel and a digital output signal in response to a recorded analog channel.

To carry out the method of the invention, the microprocessor controller is programmed to isolate the playback head from the remaining portion of the READ channel using an existing READ channel feed through cancellation circuit. Digital data pulses are applied through the READ channel. The threshold voltage applied to the amplitude sense circuit is varied and the response of the READ channel under different threshold voltages, and data pulse frequencies is monitored to determine the presence or absence of a fault in the card. Thus, by adding instructions to the microprocessor controller to initiate data, threshold levels, and measure response time for said data to propagate through the READ channel, one or more faults may be located.

DESCRIPTION THE PREFERRED EMBODIMENT

Figure 1:
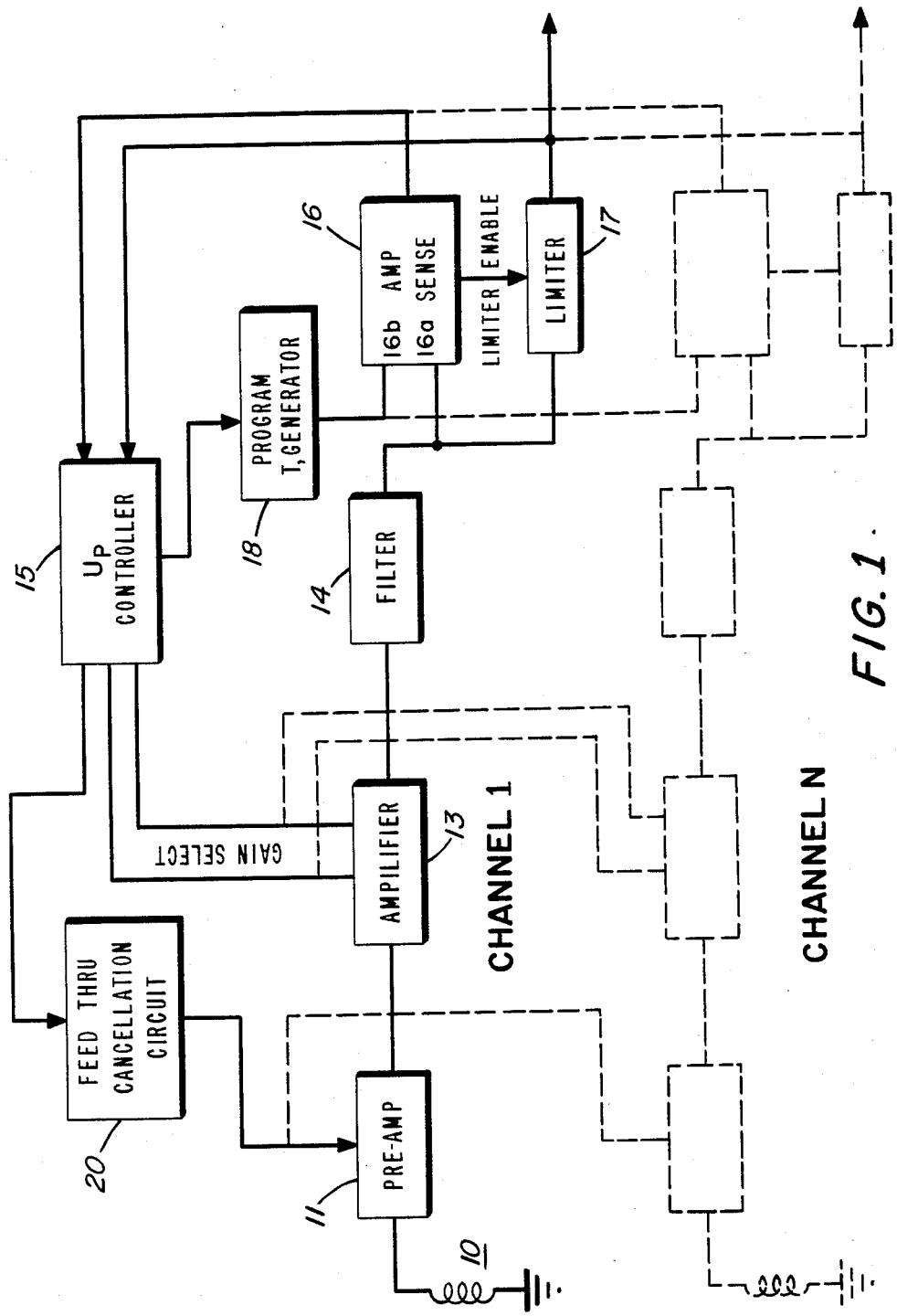
FIG. 1 is a block diagram of a typical read-channel in a magnetic tape recording system.

Referring now to FIG. 1, there is shown a block diagram of a read channel for reading one track of a magnetic tape having a plurality of N tracks which are read by N READ channels, such as is incorporated in the PIMA Analog Read Card, manufactured by International Business Machines Corporation. A READ head 10 provides an analog signal from the magnetic tape of channel 1. A preamplifier 11 provides gain to the read signal. A variable gain amplifier 13 receives the preamplifier signal and imparts a fixed gain, under control of microprocessor controller 15 to the preamplifier signal. A filter 14 is provided having a low pass and bandpass characteristic for passing the data signal. A limiter 17 amplitude limits the resulting read analog signal to provide an essentially digital signal for further processing.

The read channel includes a programmable threshold circuit 18 and amplitude sensor 16 which together with microprocessor 15 set up the gain of the amplifier 13.

Microprocessor 15 will at the time the tape is loaded to be read, set a nominal gain for amplifier 13. Filter 14 forms a portion of an equalizer circuit for the recovered analog data signal. An amplitude sense circuit 16 receives on one input 16a the filtered signal, and on a second input 16b a threshold level from programmable threshold generator 18. The threshold generator is common to all tracks of the recording system. The reference level is selectable to correspond to at least four signal conditions:

90% of a nominal amplitude level for DGC set up
16% of the nominal (for read while write)
10% of the nominal (for read only)
0% of the nominal (for nominal read only)
30% of the nominal (for test only)
120% of the nominal (for test only)

During initial power up, the gain of the amplifier 13 is set to a nominal value, corresponding to a predetermined amplitude level for initial set up of amplifier 13. The magnetic tape includes an initial portion which is recorded with 1's. The threshold generator applies a 90% nominal amplitude level for amplitude sense circuit 16 to compare against the signal level from filter 14. The amplitude sense circuit 16 during startup of the tape system will provide a binary 1 output each time an input signal exceeds the nominal threshold level for a predetermined time as set by an internal timing generator. In the absence of a binary 1 indication from amplitude sense circuit 16, the microprocessor controller 15 incrementally increases the gain of amplifier 13 until a binary 1 is produced. The internal timing generator insures that the nominal amplitude level remains for a predetermined time thus guarding against premature triggering on transients or other nondata occurrences. Additionally, the timing generator determines that the signal level remains below nominal for a predetermined level before switching from a binary 1 output signal to a binary 0 indicating receipt of a valid signal level. The limiter is enabled by the Amp sense circuit 16 when the criteria established by the internal timing generator is met. Thus by examining the limiter output under fixed input conditions to the READ channel, a malfunction in the Amp sense circuit 16 is detected.

When the system gain is set by the microprocessor controller 15 in combination with the amplitude sense circuit 16, and amplifier 13, limiter 17, a standard zero crossing detector, will provide the digital data from the READ head. The limiter provides a binary output every time the input signal rises above a zero crossing, and a binary 0 when the signal is below a zero crossing. The system is therefore set to perform the functions READ ONLY or READ and WRITE simultaneously. During these functions the threshold reference voltage is set to 10% of the nominal level, and 16% of nominal, respectively.

The Preamp 11 has associated therewith a Feed through cancellation circuit 20 used during the READ while WRITE functions to inhibit a WRITE signal from passing through the READ channel. The proximity of WRITE heads, not shown, to the READ head tends to induce inductive transients into the READ channel. This circuit will form a component in the diagnostic tests to be described to apply a test signal to the READ channel. This circuit operates by adding a cancellation component from the WRITE circuit to the READ signal which when combined cancels out the induced transients.

Figure 2:
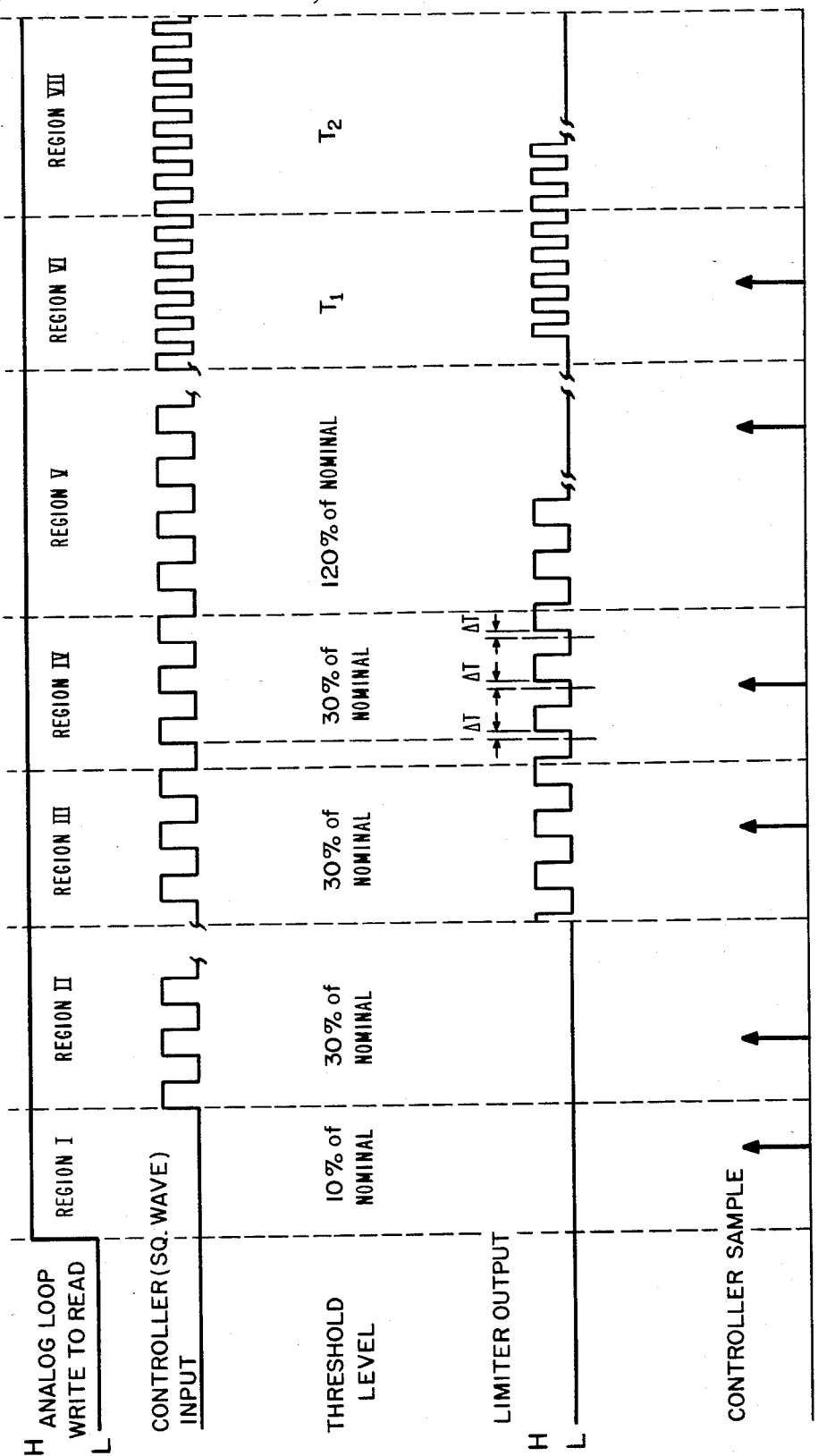
FIG. 2 is timing diagram showing the pulses generated during diagnostic testing of the system.

The aforesaid system is diagnosed in accordance with the present invention by applying a plurality of digital signals to the READ channel via Feed Thru cancellation circuit 20 in accordance with FIG. 2. In the present invention, the Feed through cancellation circuit 20 is merely used to conveniently apply to the READ channel data pulses by substituting the cancellation signal with a series of binary signals in the form of a square wave. The DGC amplifier during the following tests is set to a fixed gain which is typically the minimum gain setting for the amplifier.

Referring now to FIG. 2, there is shown the seven tests I–VII performed to diagnose the read channel. Region I illustrates a check given to determine whether under No READ signal conditions, the limiter is toggling. The microprocessor 15 checks to determine if limiter 17 is providing a signal which indicates either an oscillation in the read channel, excessive noise, or a threshold level from the programmable threshold generator 18 is malfunctioning. During this test, the programmable threshold generator 18 is set at 10% of the nominal threshold level.

At the completion of the Region I test, the level presented by threshold generator 18 is set at 30% of nominal. An input square wave signal including a series of binary 1's is applied through Feed through cancellation circuit 20 to the READ channel. The frequency is selected to be substantially the same as the normally processed data. The limiter 17 output is again monitored in response to the application of a data signal to the READ channel. The microprocessor controller 15 is programmed during this test to provide an interval timing between the sending of a data signal and the response of the limiter 17. As was described with respect to the operation of the amplitude sense circuit, the circuit includes a timing generator which requires that the input signal be above a certain level for a minimum time before indicating the presence of a binary 1 input signal. Region II determines by measuring the interval between an input signal on the read channel and the response of limiter 17 whether this portion of the limiter 17 timing is functioning.

In region III, the limiter 17 and amplitude sense circuit 16 is monitored after the requisite time delay of amplitude sense circuit 16 has elapsed. If any limiter 17 fails to toggle as indicated by its output signal or amplitude sense circuit 16 fails to operate, a fault has been detected. This fault is indicative of:

(1) No continuity in the channel,
(2) Insufficient gain due to malfunctioning of AMP 13
(3) Amplitude sense circuit 16 failure
(4) Limiter 17 failure
(5) Threshold generator 18 failure At the completion of the region III test, the delay from input to output of the READ channel is computed. With the programmable threshold detector set at 30% of nominal level, data pulses are initiated from microprocessor controller 15, and the feed through cancellation circuit 20. The time difference between leading edges of data pulses from limiter 17 and input data pulses is determined. The interval timing internal to the microprocessor controller 15 is accomplished in a known way by counting the number of cycles of instructions which occur between events. The resulting delay is indicative of the filter performance. The filter delay as is known to those skilled in the art, is a function of the frequency response. If the filter experiences a failure, the measured delay will be outside of the required limits. The microprocessor controller 15 compares the measured delay with an upper and lower limit. If the delay does not lie between the limits, the microprocessor controller 15 indicates a fault which is associated with the filter 14 module.

The following test of region V detects a defective amplitude sense circuit 16 or a defective amplifier 13. The threshold level of the programmable threshold detector 18 is set at 120% of a nominal level. The output of the limiter 17 is monitored and at that level of threshold voltage, the timing generator internal to amplitude sense circuit 16 previously in a high, binary 1, logic level is received, the logic level does not go low and hence, the Amp sense circuit 16 should not indicate a binary 1 level due to the internal timing generator of the Amp sense circuit 16. If a binary 1 is produced by Amp sense circuit 16, the circuit is determined to be defective.

Region VI is yet another test of the filter 14 performance. The input data signal is increased to twice the rate of the previous test data rate. A threshold level T1 is applied by threshold generator 18 to amplitude sense circuit 16 corresponding to a minimum amplitude level for the increased frequency. If the amplitude sense circuit produces a binary 1, the rolloff characteristic is verified.

Region VII is a repeat of the test of region VI but at a different threshold level T2. With the combination of Region VI and VII the rolloff characteristic of the filter are verified at two different points of the response curve. Of course, more points can be taken at additional frequencies to verify with a greater accuracy the functioning of the filter 14.

Each of the tests of regions I through VII are conducted in sequence by the microprocessor controller 15. If at any time one of the tests indicates a failure, the sequence is interrupted and the microprocessor controller sets a flag indicating which card has failed. The control panel associated with microprocessor controller 15 indicates the fault detection and appropriate card substitutions to repair the fault. The controller may, of course, contain additional programming steps to perform the above tests on all READ channels of the multi-track system, either in sequence or simultaneously.

Thus, there has been described a test procedure for determining a fault in a READ channel of a multiple track magnetic tape recording system. Those skilled in the art will recognize yet other embodiments of the invention described by the claims which follow.

What is claimed is:

1. In a data recording system including a READ channel having a preamplifier connected to receive a recorded data signal from a magnetic read head, a gain controlled amplifier, connected to said preamplifier, an equalizing filter connected to said gain controlled amplifier, an amplitude level sense circuit which provides an output binary 1 level when a signal level in said channel is above a programmable threshold signal for a first minimum time interval, and when said signal level subsequently declines below said threshold level for a second minimum time interval, and a limiter connected to said filter, a method for determining a fault in said READ channel comprising:

reducing said threshold signal to a fraction of a nominal level;

isolating said read head from said preamplifier;

applying a plurality of input data pulses to said preamplifier;

measuring the difference in time between said input data pulses and an output indication from said limiter circuit; and comparing said difference in time to a predetermined time differential whereby the presence of a fault condition in said READ channel is detected.

2. The method of claim 1 further comprising the steps of:

increasing said threshold level to exceed the nominal level; and measuring the output levels of said limiter circuit whereby the presence of a changing output logic level indicates a fault.

3. The method of claim 1 further comprising:

measuring the time interval between data pulses applied to said preamplifier, and response data pulses from said limiter; and comparing said time interval with a predetermined time differential whereby the presence of a fault condition in said READ channel is detected.

4. The method of claim 3 further comprising the steps of:

applying said data pulses at a second frequency;

applying a first threshold level to said amplitude level sense circuit when said second frequency of pulses are present, and a second threshold level to said amplitude level sense circuit, said threshold levels being selected to relate to said equalizer filter frequency response; and detecting a change in state of a logic level produced at said amplitude level sense circuit during said respective data pulse signal frequencies and threshold levels whereby the absence of a change in state indicates a fault in said read channel.

5. A method for detecting a defective recording channel in a digital recording system of the type including a filter having a required bandwidth characteristic followed by a limiter comprising:

applying a digital pulse stream to said channel at a first frequency, and thence at a second frequency within said filter bandwidth;

comparing the amplitude of pulses produced by said READ channel with a threshold level;

enabling said limiter to pass pulses from said filter when said amplitude exceeds said threshold level; and comparing delay times of said pulses through said READ channel with first and second reference delay times whereby a fault is detected when one of said comparisons indicates a difference greater than a predetermined level.

6. A method for detecting a fault in a digital recording channel including a gain controlled amplifier, gain controlled in response to an amplitude sense module in said channel which detects the signal level and normalizes said signal level with respect to a preselected threshold level, and a limiter responsive to a gain normalized digital signal, and which is enabled by said amplitude sense module, for limiting the amplitude of a gain normalized signal, comprising the steps of:

maintaining the input of said channel signal free;

sensing the output of said limiter in the absence of an input signal, whereby the presence of an output signal from said limiter indicates a defective channel;

supplying in the absence of a signal from said limiter an input digital signal to said channel, and a threshold signal having an amplitude level which is a fraction of a nominal operating digital signal level;

measuring the time interval between the initial occurrence of said digital signal and the initial occurrence of a signal from said limiter output, whereby a time interval below a predetermined time interval indicates a fault; and measuring the time interval between output pulses from said limiter and said input digital signals, whereby an interval between pulses greater than a predetermined level indicates a fault.

7. The method of claim 6 further comprising:

increasing said threshold amplitude level above a nominal amplitude operating digital signal level; and detecting the presence or absence of digital signals from said limiter, the presence of said signals indicating a fault in said recording channel.

* * * * *